United States Patent
Ghosh

(10) Patent No.: US 10,320,616 B2
(45) Date of Patent: Jun. 11, 2019

(54) METHOD AND A SYSTEM FOR SIDEBAND SERVER MANAGEMENT

(71) Applicant: Wipro Limited, Bangalore (IN)

(72) Inventor: Soumik Ghosh, Kolkata (IN)

(73) Assignee: Wipro Limited, Bangalore (IN)

( * ) Notice: Subject to any disclaimer, the term of this patent is extended or adjusted under 35 U.S.C. 154(b) by 383 days.

(21) Appl. No.: 15/007,390

(22) Filed: Jan. 27, 2016

(65) Prior Publication Data

US 2017/0171028 A1   Jun. 15, 2017

(30) Foreign Application Priority Data

Dec. 15, 2015  (IN) .......................... 6725/CHE/2015

(51) Int. Cl.
*H04W 4/80* (2018.01)
*H04L 12/24* (2006.01)
(Continued)

(52) U.S. Cl.
CPC .......... *H04L 41/12* (2013.01); *H04L 41/0226* (2013.01); *H04L 67/2823* (2013.01); *H04L 67/42* (2013.01); *H04L 69/08* (2013.01); *H04W 4/80* (2018.02); *H04L 41/042* (2013.01); *H04L 67/1002* (2013.01); *H04W 84/20* (2013.01)

(58) Field of Classification Search
CPC ..... H04W 4/008; H04W 84/18; H04W 84/20; H04R 2420/07; H04L 69/08; H04L 41/12; H04L 617/04; H04L 67/14
See application file for complete search history.

(56) References Cited

U.S. PATENT DOCUMENTS

| | | | |
|---|---|---|---|
| 6,678,516 B2 * | 1/2004 | Nordman | H04L 67/306 370/338 |
| 6,795,421 B1 * | 9/2004 | Heinonen | H04W 88/08 370/338 |

(Continued)

FOREIGN PATENT DOCUMENTS

CN          102902594          1/2013

OTHER PUBLICATIONS

European Search Report dated Jul. 26, 2016 in European Patent Office in counterpart European Patent No. Application 16160020.0. 22 pages.

*Primary Examiner* — Ninos Donabed
(74) *Attorney, Agent, or Firm* — Finnegan, Henderson, Farabow, Garrett & Dunner, LLP

(57) ABSTRACT

The present disclosure discloses a method and a system for sideband server management. The method comprises receiving, by a server management board, a management request from a client device, where the management request comprises at least one internet protocol packet and the management request is targeted to a predefined server among plurality of servers, converting the at least one internet protocol packet to at least one Bluetooth protocol packet, identifying a master Bluetooth module from one or more master Bluetooth modules of the server management board based on a routing table, where the master Bluetooth module corresponds to the targeted predefined server and transmitting the at least one Bluetooth protocol packet from the master Bluetooth module to a corresponding slave Bluetooth module of the targeted predefined server.

9 Claims, 4 Drawing Sheets

(51) Int. Cl.
*H04L 29/06* (2006.01)
*H04L 29/08* (2006.01)
*H04W 84/20* (2009.01)

(56) References Cited

U.S. PATENT DOCUMENTS

| | | | |
|---|---|---|---|
| 8,171,142 B2 | 5/2012 | Kolin et al. | |
| 8,259,176 B2* | 9/2012 | Misawa | G01C 21/20 348/100 |
| 2002/0091991 A1* | 7/2002 | Castro | G06F 9/06 717/106 |
| 2002/0141442 A1* | 10/2002 | Plain | H04L 29/06 370/466 |
| 2002/0172176 A1* | 11/2002 | Moss | H04L 12/5692 370/338 |
| 2002/0172177 A1* | 11/2002 | Gooch | H04L 12/5692 370/338 |
| 2002/0172191 A1* | 11/2002 | Harrison | H04L 12/5692 370/352 |
| 2002/0172218 A1* | 11/2002 | Harrison | H04L 12/5692 370/449 |
| 2002/0173296 A1* | 11/2002 | Nordman | H04L 67/306 455/414.1 |
| 2003/0112789 A1* | 6/2003 | Heinonen | H04W 28/16 370/349 |
| 2003/0176200 A1* | 9/2003 | Harrison | H04L 12/5692 455/500 |
| 2003/0229900 A1* | 12/2003 | Reisman | G06F 16/954 725/87 |
| 2004/0071123 A1* | 4/2004 | Shin | H04L 61/2015 370/338 |
| 2004/0092271 A1* | 5/2004 | Viikari | H04W 4/02 455/456.2 |
| 2004/0120323 A1* | 6/2004 | Viikari | H04W 4/02 370/395.5 |
| 2004/0203382 A1* | 10/2004 | Park | H04L 29/06027 455/41.2 |
| 2004/0258033 A1* | 12/2004 | Heinonen | H04W 88/08 370/338 |
| 2005/0286466 A1* | 12/2005 | Tagg | H04L 12/2856 370/329 |
| 2007/0027948 A1* | 2/2007 | Engebretsen | G06F 1/181 709/203 |
| 2007/0130481 A1 | 6/2007 | Takahashi et al. | |
| 2007/0195803 A1* | 8/2007 | Lowery | H04L 29/12009 370/401 |
| 2008/0274695 A1* | 11/2008 | Muth | G06F 3/038 455/41.2 |
| 2012/0057518 A1* | 3/2012 | Herrala | H04W 84/20 370/315 |
| 2013/0058266 A1* | 3/2013 | Li | H04W 76/12 370/310 |
| 2013/0179558 A1 | 7/2013 | Lin et al. | |
| 2014/0253093 A1 | 9/2014 | Bermudez Rodriguez et al. | |
| 2014/0313101 A1* | 10/2014 | Chen | G06F 3/1446 345/1.3 |
| 2015/0135206 A1* | 5/2015 | Reisman | H04N 21/26283 725/18 |

* cited by examiner

METHOD AND A SYSTEM FOR SIDEBAND SERVER MANAGEMENT

TECHNICAL FIELD

The present disclosure relates to a server system. More specifically, the present disclosure discloses a method and a system for sideband server management, thereby managing multiple management requests.

BACKGROUND

Side band management for server means, there is a module in a server box which has an embedded operating system running in it, there is an Ethernet port attached to the module and the module can be used to remotely manage and monitor other modules in the server. This module is used purely for management and monitoring purposes. In a typical application of sideband server management, Ethernet channels are used for managing multiple requests made by clients. Here, Ethernet channels for Input-Output I/O and Ethernet channels for management of the servers are kept separate for achieving uninterrupted I/O, high performance and higher throughput. It is noted that there is a significant Ethernet bandwidth used for the management purposes of the servers in the server rack, which can be avoided. Also, when a request is made by a client device, the request carries information which may be served by the server. Here, the request comprises Internet Protocol (IP) packet for a server. In a typical application, numerous requests are made and each request carries an IP packet. Hence, there is a large utilization of bandwidth and increase in the size of data.

SUMMARY

This disclosure provides insight on a method and a system for sideband server management. Disclosed herein is a method for sideband server management, the method comprising, receiving, by a server management board, a management request from a client device, converting at least one internet protocol packet of the management request to at least one Bluetooth protocol packet, identifying a master Bluetooth module from one or more master Bluetooth modules of the server management board based on a routing table, and transmitting the at least one Bluetooth protocol packet to corresponding slave Bluetooth module of the targeted predefined server.

In an embodiment, disclosed is a server management board for sideband server management, comprising, a processor and a memory communicatively coupled to the processor. The memory stores processor-executable instructions, which, on execution, causes the processor to, receive a management request from a client device, convert at least one internet protocol packet of the management request to at least one Bluetooth protocol packet, identify a master Bluetooth module from one or more master Bluetooth modules of the server management board based on a routing table and transmit the at least one Bluetooth protocol packet to corresponding slave Bluetooth module of the targeted predefined server.

In an embodiment of the present disclosure, a system for sideband server management is disclosed. The system comprises the server management board and plurality of servers. Each of the plurality of server comprises a slave Bluetooth module, to receive the at least one Bluetooth protocol packet from the server management board and convert the at least one Bluetooth protocol packet to at least one internet protocol packet and a sideband module to execute the management request comprising the at least one internet protocol packet.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The novel features and characteristic of the disclosure are set forth in the appended claims. The disclosure itself, however, as well as a preferred mode of use, further objectives and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which:

Figure 1:
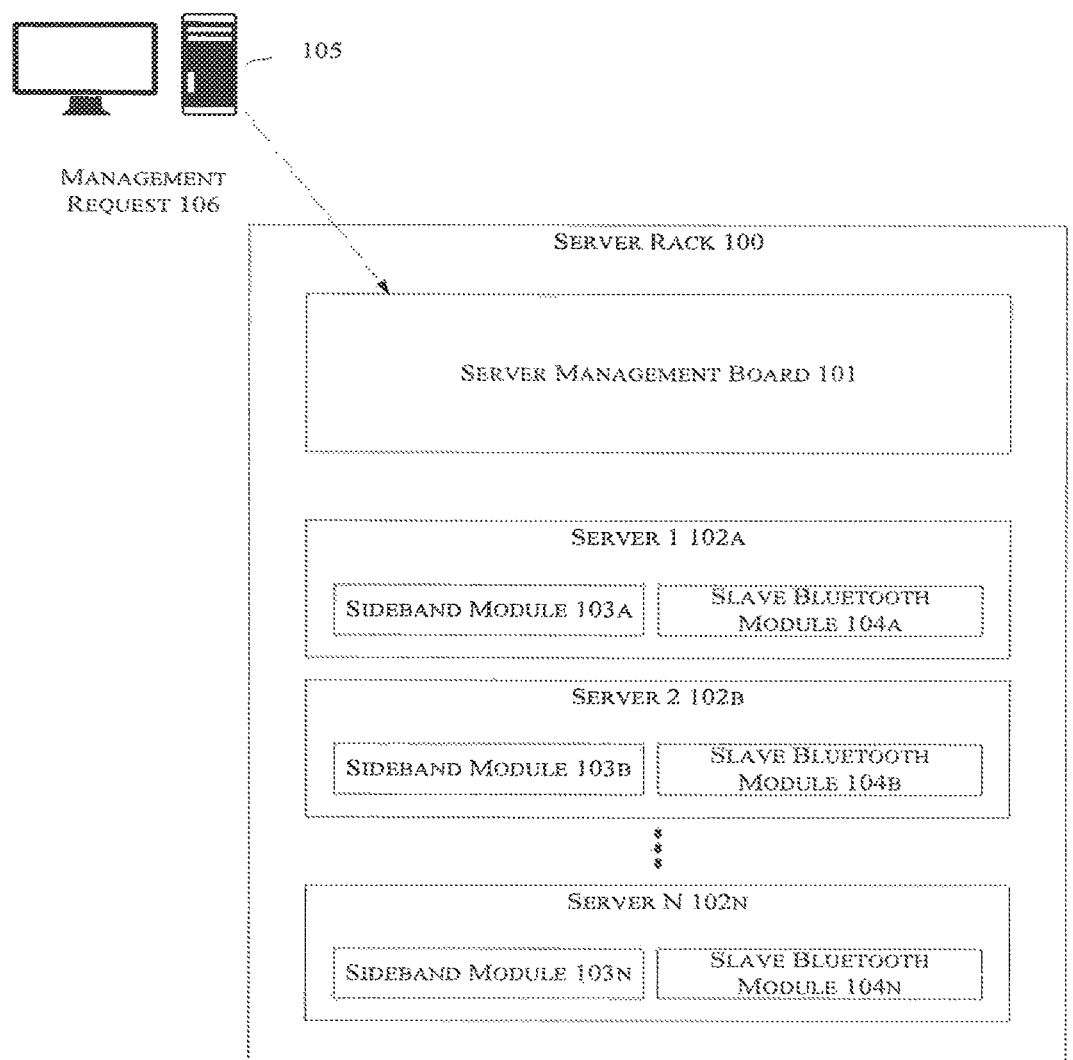
FIG. 1 illustrates a block diagram of a system for sideband server management in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternatives falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

Embodiments of the present disclosure relate to a method and a system for sideband server management. The present subject matter makes use of Bluetooth protocol to communicate between servers to cater multiple requests from clients. The use of Bluetooth modules to communicate between the servers helps reduce complexity of the system, thereby reducing the power consumption of the system. Also, the number of IP packets used is substantially reduced, thus saving bandwidth usage.

The present disclosure can be employed for any type of server architecture. For example, the present invention can be used in rack architecture, blade architecture, or the like. In an exemplary embodiment, the present disclosure uses server rack architecture to describe the embodiments of the disclosure.

In an embodiment of the present disclosure, a system for sideband server management is presented. FIG. 1 illustrates a block diagram of a sideband server management system. The figure shows a server rack 100 comprising a server management board 101 and one or more servers. The server management board 101 may receive a management request 106 from a client device 105. The management request 106 may comprise at least one internet protocol packet. The management request may be targeted to a pre-defined server. The targeted predefined server may be tracked by the server management board 101 based on a routing table. Upon tracking the targeted predefined server, the server management board 101 may transmit the management request 106 to the targeted predefined server. In an embodiment, the number of servers in a server rack 100 can vary from one to many. The servers 102a, 102b . . . 102n are collectively represented as one or more servers 102 in the present disclosure. Each of the one or more servers 102 comprises a sideband module and a slave Bluetooth module. The sideband modules 103a, 103b . . . 103n and the slave Bluetooth modules 104a, 104b . . . 104n can be collectively referred as one or more sideband modules 103 and one or more slave Bluetooth modules 104 respectively. The slave Bluetooth module 104 of the targeted predefined server may receive the management request 106 from the server management board 101. The received management request 106 comprises at least one Bluetooth protocol packet. The at least one Bluetooth protocol packet may be converted to at least one internet protocol packet. Further, the at least one IP packet may be transmitted to the sideband module 103 for execution.

Figure 2:
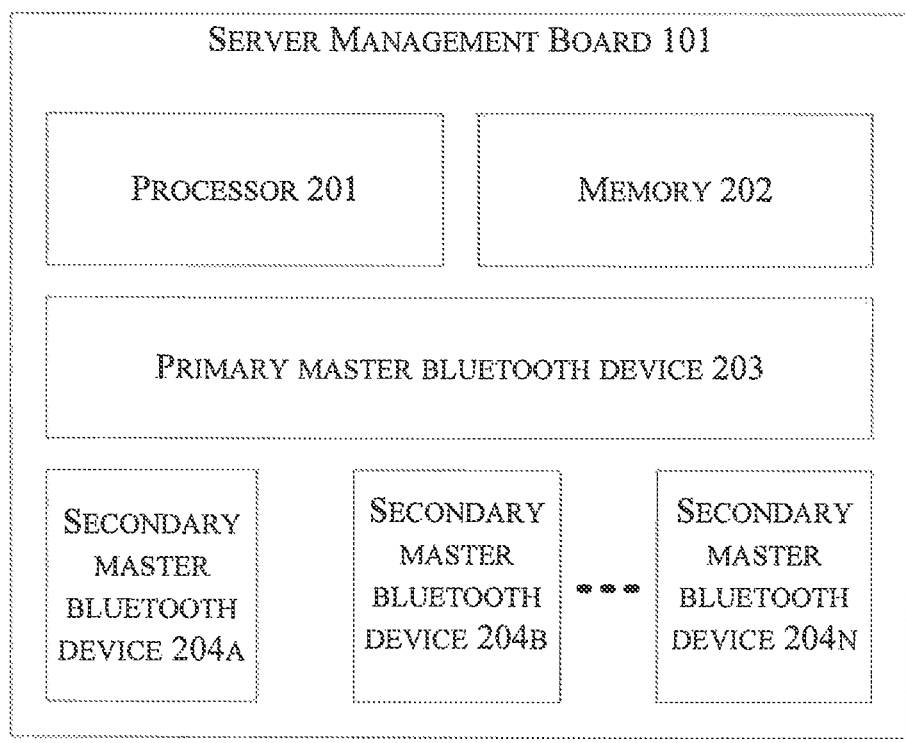
FIG. 2 illustrates an exemplary block diagram of a server management board in accordance with some embodiments of the present disclosure.

FIG. 2 of the present disclosure discloses a server management board 101. The server management board 101 may comprise a processor 201, a memory 202 communicatively coupled to the processor 201 and one or more master Bluetooth modules. In an embodiment, the one or more master Bluetooth modules may comprise at least one primary master Bluetooth device 203 associated with one or more secondary master Bluetooth devices. The figure shows the one or more secondary master Bluetooth devices represented as 204a, 204b . . . 204n. In general, the one or more secondary master Bluetooth devices can be referred to as one or more secondary Bluetooth devices 202 herein in this disclosure. In an exemplary embodiment, each of the one or more secondary Bluetooth devices 204 may manage at least seven servers 102.

In a typical scenario, a client device may connect with a server sideband module using one of various protocols like Secure Shell (SSH), Hyper Text Transfer Protocol (HTTP), File Transfer Protocol (FTP), etc. Each protocol connection may be established using an IP address and a port followed by any other protocol specific information. In the present disclosure, the client device 105 may establish a connection with the server management board 101 using only one IP address. Each management request 106 may be forwarded to the same IP address. However for each protocol on each server 102, a different port may be available in the server management board 101. Hence, during start-up process of the whole topology the server management board 101 may advertise all possible ports for connection along with an identification which is (server id+service (e.g. SSH/HTTP/FTP)). The client device 105 may connect with the server management board 101 using the IP address and one of the advertised ports. Once a packet is received by the server management board 101, the server management board 101 may process the packet to deliver that packet over Bluetooth protocol. The server management board 101 may wrap original protocol packet in a Bluetooth protocol packet. Further, the server management board 101 may identify a channel to the server 102 to deliver the bluetooth protocol packet. A routing table may be used to identify a targeted server's slave Bluetooth module 104. The routing table can have several fields as shown below:

| PORT | BLUETOOTH ID | PROTOCOL |
| --- | --- | --- |
| 100 | 1:2:3 | FTP |
| 200 | 1:2:4 | SSH |

A sample structure to generate the routing table can be in the form:

```
Struct_routing_table_
{
  _Port_ : integer
  _bluetooth_id_ : string
  _protocol_ : Enum
  _server_id_ : string
  _bluetooth_id_delimeter : string
}
```

The format for Bluetooth id is:
<Primary Bluetooth master id>: <Secondary Bluetooth master id>: <Side band Bluetooth id>.

In an embodiment, the processor 201 may advertise a list of ports to the client device 105. The client device 105 may connect with the processor 201 of the server management board 101 using the IP address and a port from the list. Further, the processor 201 may receive the management request 106 from the client device 105. In one example, the management request 106 may comprise at least one Internet Protocol (IP) packet. Upon receiving the management request 106 from the client device 105, the processor 201 may convert the at least one internet protocol packet to at least one Bluetooth protocol packet. Then, the processor 201 may transmit the at least one Bluetooth protocol packet to the at least one primary master Bluetooth device 203. The at least one primary master Bluetooth device 203 may identify corresponding one or more secondary master Bluetooth device 204 based on the routing table. Thereafter, the primary master Bluetooth device 203 may forward the at least one Bluetooth protocol packet to the identified secondary master Bluetooth device 204. Further, the identified secondary Bluetooth device 204 may transmit the at least one Bluetooth protocol packet to the corresponding server 102.

Figure 3:
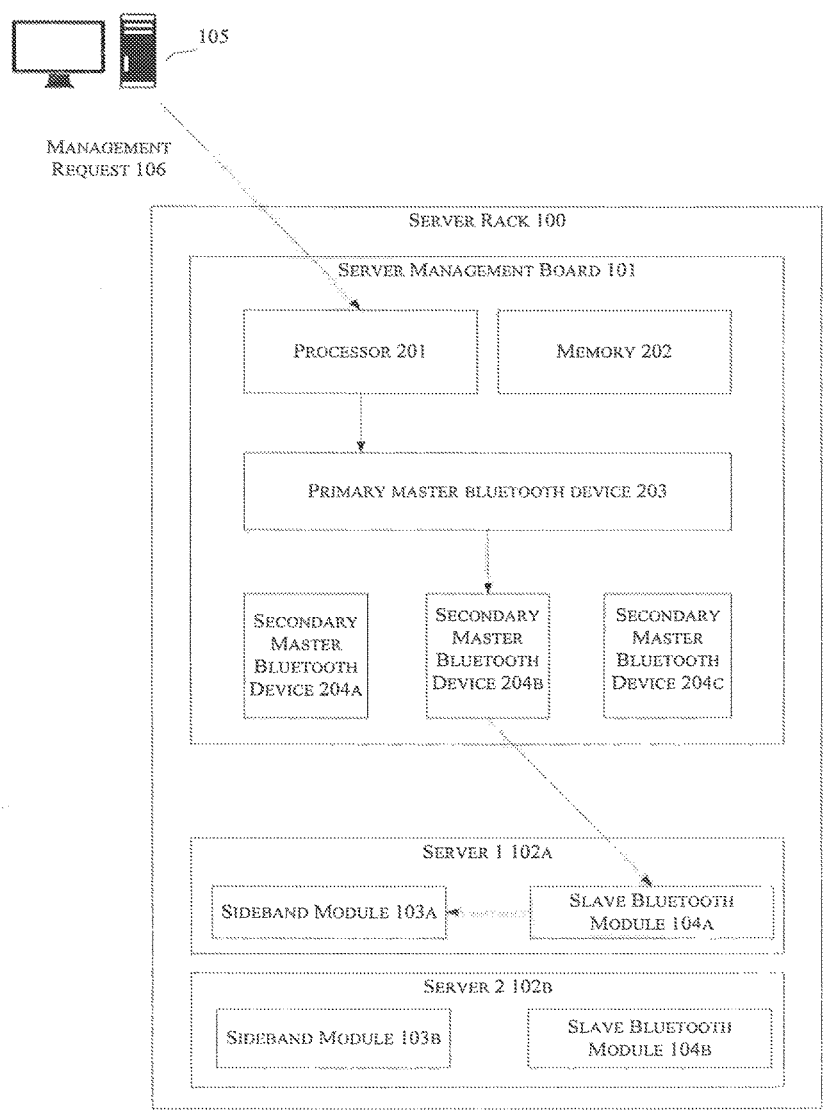
FIG. 3 shows a block diagram illustrating the data flow in the server rack in accordance with some embodiments of the present disclosure.

FIG. 3 shows a block diagram illustrating the flow of management request 106 in the server rack 100 with some embodiments of the present disclosure. For example, let the primary master Bluetooth device 203 be associated with three secondary master Bluetooth devices 204a, 204b and 204c. Let the secondary master device 204b manage servers 1 to server 7 (server 3 to server 21 not shown in figure), secondary master Bluetooth device 204a manage server 8 to server 14 and secondary master Bluetooth device 204c manage server 15 to server 23. Let server 1 be considered as the targeted predefined server. As explained in the above paragraph, the processor 201 may receive the management request 106. Further, the processor 201 may convert the at least one internet protocol packet to at least one Bluetooth protocol packet. Further, the processor 201 may forward the at least one Bluetooth protocol packet to the primary master Bluetooth device 203. The primary master Bluetooth device 203 may identify the secondary master Bluetooth device 204 based on the routing table (Table 1). Here, secondary master Bluetooth device 204b may correspond to the targeted predefined server, server 1. Hence, the secondary master Bluetooth device 204b may be identified by the primary master Bluetooth device 203. Further, the secondary master Bluetooth device 204b may transmit the at least one Bluetooth protocol packet to the server 1. The slave Bluetooth module 104a of the server 1 may receive the at least one Bluetooth protocol packet. Further, the slave Bluetooth module may convert the at least one Bluetooth protocol packet to at least one internet protocol packet. Furthermore, the at least one internet protocol packet may be transmitted to the sideband module 103a for execution of the management request 106.

Figure 4:
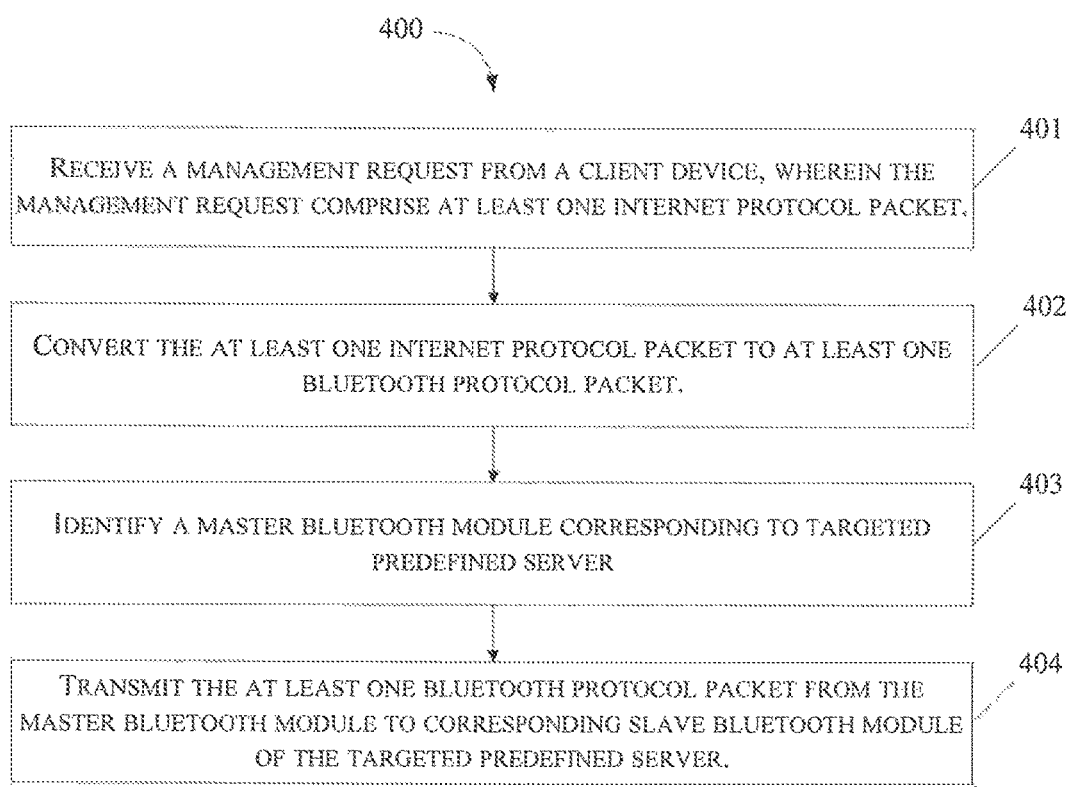
FIG. 4 illustrates a flowchart illustrating a method for sideband server management in accordance with some embodiments of the present disclosure.

FIG. 4 shows a flowchart illustrating a method for sideband server management, in accordance with some embodiments of the present disclosure.

As illustrated in FIG. 4, the method 400 comprises one or more steps for sideband server management. The method 400 may be described in the general context of computer executable instructions. Generally, computer executable instructions can include routines, programs, objects, components, data structures, procedures, modules, and functions, which perform particular functions or implement particular abstract data types.

The order in which the method 400 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At step 401, the processor 201 of the server management board 101 may receive a management request 106 from the client device 105. The management request 106 may comprise at least one internet protocol packet. The management request is targeted to a predefined server among plurality of servers.

At step 402, the processor 201 may convert the at least one internet protocol packet to at least one Bluetooth protocol packet. The one or more master Bluetooth modules can receive only Bluetooth protocol packets. To comply with the Bluetooth protocol standards, the processor 201 may convert each of the at least one internet protocol packet to at least one Bluetooth protocol packet. Further, the processor 201 may transmit the at least one Bluetooth protocol packet to the one or more master Bluetooth module.

In an embodiment, the one or more Bluetooth module may comprise at least one primary master Bluetooth device 203. The at least one primary master Bluetooth device is associated with one or more secondary master Bluetooth devices 204.

At step 403, the at least one primary master Bluetooth device 203 may identify a secondary master Bluetooth module from one or more secondary master Bluetooth device 204 corresponding to the targeted predefined server. The identification may take place based on the routing table. From the port number received with the management request 106, the corresponding secondary master Bluetooth device 204 may be identified by the primary master Bluetooth device 203. Further, the primary master Bluetooth device 203 may forward the at least one Bluetooth protocol packet to the identified secondary master Bluetooth device 204, corresponding to the targeted predefined server.

At step 404, the identified secondary Bluetooth master device 204 may transmit the at least one Bluetooth protocol packet to the corresponding server 102. The secondary master Bluetooth device 204 may track the targeted predefined server among plurality of servers 102 to transmit the at least one Bluetooth protocol packet.

In an embodiment, the at least one Bluetooth protocol packet may be received by the slave Bluetooth module 104 of the targeted predefined server. Further, the slave Bluetooth module 104 may convert the at least one Bluetooth protocol packet to at least one internet protocol packet. Lastly, the sideband module 103 of the targeted predefined server executes the at least one internet protocol packet.

The terms "an embodiment", "embodiment", "embodiments", "the embodiment", "the embodiments", "one or more embodiments", "some embodiments", and "one embodiment" mean "one or more but not all embodiments of the inventions" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article whether or not they cooperate may be used in place of a single device/article. Similarly, where more than one device or article is described herein whether or not they cooperate, it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 4 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Technical Advantages of the Present Invention

In one embodiment, the present disclosure provides techniques for improving the side band management of the rack servers, with objectives of reducing Total Cost of Ownership (TCO) significantly. TCO involves various parameters including power, space, and effective utilization of resources without compromising performance and availability of resources. The above parameters for TCO makes Bluetooth a very good choice in server manageability due to inherent features of Bluetooth technology such as low power consumption, less space consumption, good performance in terms of speed etc.

In an embodiment, the present disclosure replaces the conventional Ethernet port. This saves significant cost and configuration time required for the management of each server as the Bluetooth device seated within each of the server is used for the communication pertaining to management of the particular server.

In an embodiment of the present disclosure, the proposed method leads to reduction in the Ethernet bandwidth requirement for sideband server management by employing Bluetooth communication between servers. Further, replacing Ethernet controllers with Bluetooth modules reduces the overall power consumption. This also reduces the overall cost.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS:

| Reference number | Description |
| --- | --- |
| 100 | Server rack |
| 101 | Server management board |
| 102 | Server |
| 103 | Sideband module |
| 104 | Slave Bluetooth module |
| 105 | Client device |
| 106 | Management request |

-continued

REFERRAL NUMERALS:

| Reference number | Description |
| --- | --- |
| 201 | Processor |
| 202 | Memory |
| 203 | Primary master Bluetooth module |
| 204 | Secondary master Bluetooth module |

What is claimed is:

1. A method for sideband server management, comprising:
receiving, by a server management board, a management request from a client device, wherein the management request is targeted to remotely manage a predefined server among plurality of servers, and wherein the management request comprises at least one internet protocol packet indicating a connection port and protocol specific information of the predefined server;
converting, by the server management board, the at least one internet protocol packet to at least one Bluetooth protocol packet;
identifying, by the server management board, a channel to transmit the at least one Bluetooth protocol packet to the predefined server based on a routing table,
wherein the routing table defines a master Bluetooth module from one or more master Bluetooth modules of the server management board and a corresponding slave Bluetooth module of the predefined server, pertaining to the connection port and the protocol specific information in the management request, and
wherein the master Bluetooth module corresponds to the predefined server;
transmitting, by the server management board, the at least one Bluetooth protocol packet from the master Bluetooth module to the corresponding slave Bluetooth module of the predefined server using the identified channel;
converting, by the slave Bluetooth module, the at least one Bluetooth protocol packet to the at least one internet protocol packet; and
transmitting the at least one internet protocol packet to a sideband module configured in the predefined server to execute the management request,
wherein the plurality of servers is configured in a server rack.

2. The method as claimed in claim 1, wherein the one or more master Bluetooth modules comprises at least one primary Bluetooth device.

3. The method as claimed in claim 2, wherein the at least one primary Bluetooth device is associated with one or more secondary Bluetooth devices.

4. A server management board for sideband server management, comprising:
a processor; and
a memory communicatively coupled to the processor, wherein the memory stores processor-executable instructions, which, on execution, causes the processor to:
receive a management request from a client device wherein the management request is targeted to remotely manage a predefined server among plurality of servers, and wherein the management request comprises at least one internet protocol packet indicating a connection port and protocol specific information of the predefined server;

convert the at least one internet protocol packet to at least one Bluetooth protocol packet;

identify a channel to deliver the at least one Bluetooth protocol packet to the predefined server based on a routing table,
- wherein the routing table defines a master Bluetooth module from one or more master Bluetooth modules of the server management board and a corresponding slave Bluetooth module of the predefined server, pertaining to the connection port and the protocol specific information in the management request, and
- wherein the master Bluetooth module corresponds to the predefined server; and transmit the at least one Bluetooth protocol packet from the master Bluetooth module to the corresponding slave Bluetooth module of the predefined server using the identified channel, convert the at least one Bluetooth protocol packet to the at least one internet protocol packet; and transmit the at least one internet protocol packet to a sideband module configured in the predefined server to execute the management request, wherein the plurality of servers is configured in a server rack.

5. The server management board as claimed in claim 4, wherein the one or more master Bluetooth modules comprises at least one primary Bluetooth device.

6. The server management board as claimed in claim 5, wherein the at least one primary Bluetooth device is associated with one or more secondary Bluetooth devices.

7. A system for sideband server management, comprising:
a server management board, comprising:
a processor;
a memory communicatively coupled to the processor, wherein the memory stores processor-executable instructions, which, on execution, causes the processor to:
receive a management request from a client device, wherein the management request is targeted to remotely manage a predefined server among plurality of servers, and wherein the management request comprises at least one internet protocol packet indicating a connection port and protocol specific information of the predefined server;

convert the at least one internet protocol packet to at least one Bluetooth protocol packet;

identify a channel to deliver the at least one Bluetooth protocol packet to the predefined server based on a routing table,
- wherein the routing table defines a master Bluetooth module from one or more master Bluetooth modules of the server management board and a corresponding slave Bluetooth module of the predefined server, pertaining to the connection port and the protocol specific information in the management request, and
- wherein the master Bluetooth module corresponds to the predefined server; and transmit the at least one Bluetooth protocol packet from the master Bluetooth module to corresponding slave Bluetooth module of the predefined server using the identified channel; and the plurality of servers, wherein each of the plurality of servers comprises the slave Bluetooth module to:
receive the at least one Bluetooth protocol packet from the server management board;
convert the at least one Bluetooth protocol packet to the at least one internet protocol packet; and
transmit the at least one internet protocol packet to a sideband module configured in the predefined server to execute the management request, wherein the plurality of servers is configured in a server rack.

8. The system as claimed in claim 7, wherein the one or more master Bluetooth modules comprises at least one primary Bluetooth device.

9. The system as claimed in claim 8, wherein the at least one primary Bluetooth device is associated with one or more secondary Bluetooth devices.

\* \* \* \* \*